United States Patent

Stenlund

[15] 3,679,276

[45] July 25, 1972

[54] SELF-ALIGNING MOUNTING DEVICE, PARTICULARLY FOR HYDRAULIC OR PNEUMATIC CYLINDERS

[72] Inventor: Stig Gote Stenlund, Boras, Sweden
[73] Assignee: Monsun-Tison AB, Boras, Sweden
[22] Filed: March 4, 1971
[21] Appl. No.: 120,840

[30] Foreign Application Priority Data

March 5, 1970 Sweden....................................2968/70

[52] U.S. Cl..............................................................308/26
[51] Int. Cl. .........................................................F16c 27/00
[58] Field of Search................................................308/72, 26

[56] References Cited

UNITED STATES PATENTS 421,089   2/1970   Wood......................................308/26

Primary Examiner—Martin P. Schwadron
Assistant Examiner—Frank Susko
Attorney—Waters, Roditi, Schwartz & Nissen

[57] ABSTRACT

A self-aligning mounting device, particularly for the attachment of hydraulic or pneumatic cylinders or piston rods, comprising a mounting lug, a bushing fitted in the lug and a shaft journalled in said bushing. The circumference of at least a central portion of the bushing consists of a material having a high surface hardness and is bearing under a certain play against a surrounding ring-shaped rib consisting of non-elastic material and projecting from the inner surface of the mounting lug, the edges of said rib being deformable by plastic deformation under the influence of a load acting upon the mounting device when mounted with the shaft in a tilted position.

3 Claims, 3 Drawing Figures

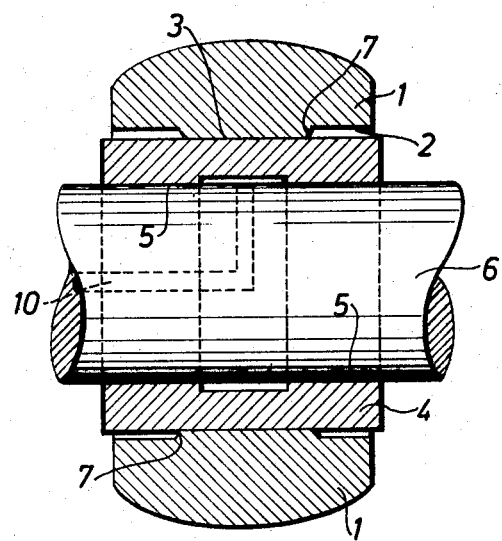
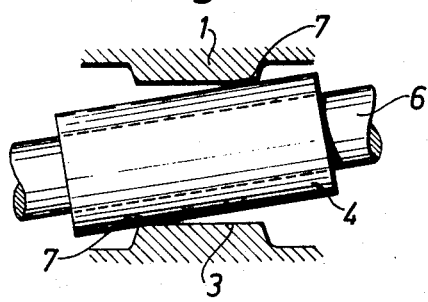
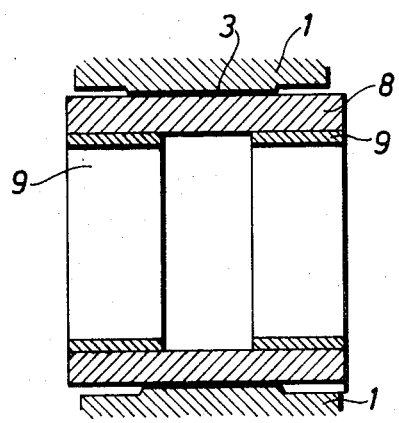

SELF-ALIGNING MOUNTING DEVICE, PARTICULARLY FOR HYDRAULIC OR PNEUMATIC CYLINDERS

The present invention relates to a self-aligning mounting device, particularly for hydraulic or pneumatic cylinders or piston rods, comprising a mounting lug and a bushing fitted in the lug and adapted for journalling of a shaft.

In connection with the attachment of a cylinder of this kind or a piston rod to a machine member it is necessary to prevent generation of bending stresses which reduce the working life of the cylinder and may give rise to damage to the cylinder or piston rod. For that reason the mounting device usually comprises a ball-joint permitting a small pivoting perpendicular to the plane in which the mounting device is hinged. In spite of the fact that, as a rule, a pivoting movement of the ball-joint of only a few degrees in both directions is sufficient, the ball-joint gives rise to an inconvenient complication, especially as the ball-joint requires demounting for inspection or renovation of the mounting device.

The object of the invention is to provide a simple self-aligning mounting device having the same advantages as a ball-joint but not the inconveniences mentioned above.

This has been achieved, according to the invention, in that the circumference of a central portion of the bushing, which central portion consists of a high surface hardness material, is bearing against a surrounding ring-shaped rib projecting from the inner surface of the mounting lug, said rib consisting of a substantially non-elastic material having less hardness than the material of the central portion of the bushing and presenting an intentionally adapted small radial play with respect to said bushing.

Any misalignment occuring at the mounting will be absorbed by the play, which may be about 0.2 to 0.3 mm, and possibly by an elastic deformation of the mounting device. When the cylinder has been mounted and the mounting device then is subjected to loading stress, a plastic deformation of the edges of the rib occurs until the load by area is reduced to a value below the yield limit by the tilted hard bushing being squeezed between the edges of the rib, which consists of a softer material than the bushing. By the plastic deformation of the edges of the rib a stabilizing of the joint is achieved and the wearing between the bushing and the mounting lug is reduced to a very small value.

The bushing is loosely journalled between the shaft and the mounting lug, but due to the fact that the torque lever acting upon the outer bearing surface of the bushing exceeds the torque lever acting upon the inner bearing surface of the bushing no motion of rotation will arise between the mounting lug and the bushing. The width of the rib in relation to the width of the mounting lug is not critical but depends above all on the strength properties of the mounting lug. Preferably, however, the bushing is a little wider than the rib for securing a proper plastic deformation of the edges of the rib. To reduce the bending moment of the shaft the bushing is, according to an embodiment of the invention, provided with an inner annular rib at each end of the bushing in which annular ribs the shaft is rotatably journalled. The interspace between the ribs of the bushing can be utilized as a reservoir for a lubricant. Preferably the bushing may consist of a self-lubricating bushing comprising a hardened sleeve in which a self-lubricating bearing bushing is fixedly mounted at each end portion of the sleeve.

The invention is described more in detail in the following specification with reference to the accompanying drawing illustrating two embodiments of the mounting device according to the invention.

FIG. 1 is a longitudinal section through an embodiment of the invention,

FIG. 2 is a schematic sectional view of the mounting device shown in FIG. 1, in loaded state, and FIG. 3 is a longitudinal section through a further embodiment of the invention.

The mounting device shown in FIGS. 1 and 2 comprises a mounting lug 1 presenting a cylindrical opening 2 in which a ring-shaped rib 3 is situated. In the opening 2 there is a bushing 4 having a radial play of about 0.2 to 0.3 mm in relation to the rib 3, which bushing consists of a material having a high surface hardness, e.g., tenifer treated steel. Two annular ribs 5 are positioned at the inner end portions of the bushing 4, by means of which ribs the bushing is rotatably journalled on a shaft 6 consisting of e.g., toughened steel which might be tenifer treated too. The shaft 6 is provided with a grease channel 10 for lubricating the bearing of the shaft.

The bushing 4 consists of a material having an essentially higher surface hardness than the material of the rib 3 of the mounting lug 1, so that at the tilting of the shaft 6 and bushing 4 the edges 7 of the rib are subjected to a plastic deformation, as shown schematically in FIG. 2.

The mounting device shown in FIG. 3 differs from that in FIG. 1 in that the bushing in this case comprises a sleeve 8 made of hardened steel, which sleeve is provided with self-lubricating bearing bushings 9 secured by pressing to the inner surface of the end portions of the sleeve. After a properly executed initial lubricating, a cylinder provided with a mounting device of the kind described above can, as has been verified by tests, be mounted with a misalignment of $\pm 2.5°$, and after that can be considered as free from maintenance for about 500,000 alternating stress situations at a maximum working pressure of 160 bar even at high duty operation including very rapid changes of the load.

The shaft 6 may be fixedly mounted in a fork-shaped bracket, not shown, which may be attached to a machine frame or a movable machine part, in which case lug 1 may be fixedly attached to a cylinder, not shown, or a piston rod, respectively, or vice versa. The mounting device according to the invention also can be used in connection with other machine elements than hydraulic or pneumatic cylinders, e.g., for connecting pivoted operating arms.

I claim:

1. A self-aligning mounting device, particularly for hydraulic or pneumatic cylinders or piston rods, comprising a mounting lug, a bushing fitted in the lug and a shaft journalled in said bushing, wherein the circumference of a central portion of the bushing, which central portion consists of a high surface hardness material, is bearing against a surrounding ring-shaped rib projecting from the inner surface of the mounting lug, said rib consisting of a substantially non-elastic material having less hardness than the material of the central portion of the bushing and presenting an intentionally adapted small radial play with respect to said bushing.

2. A mounting device as claimed in claim 1, characterized in that the inner surface of the end portions of the bushing are provided with each an annular rib, in which ribs the shaft is rotatably journalled.

3. A mounting device as claimed in claim 1, characterized in that the bushing consists of a hardened sleeve in which a self-lubricating bearing bushing is fixedly mounted at each end portion of the sleeve.

* * * * *